W. H. PRATT.
DEVICE FOR MEASURING TIME INTERVALS.
APPLICATION FILED JAN. 15, 1908.
1,022,593.
Patented Apr. 9, 1912
2 SHEETS—SHEET 2.
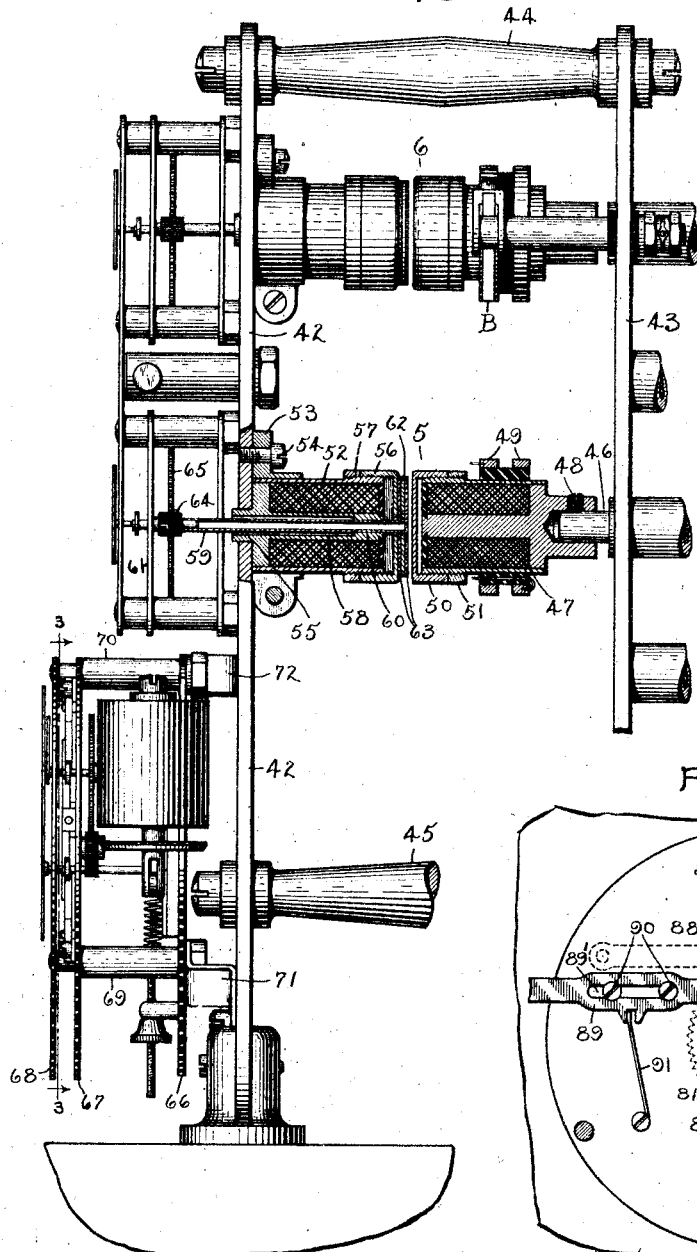
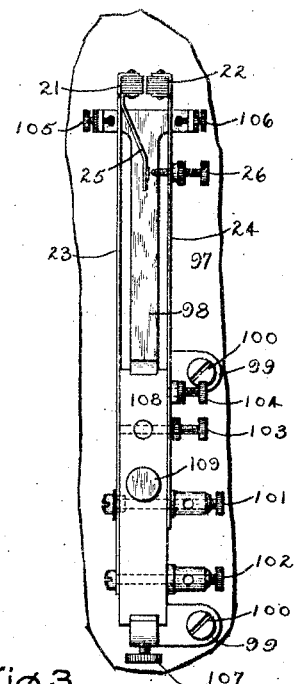
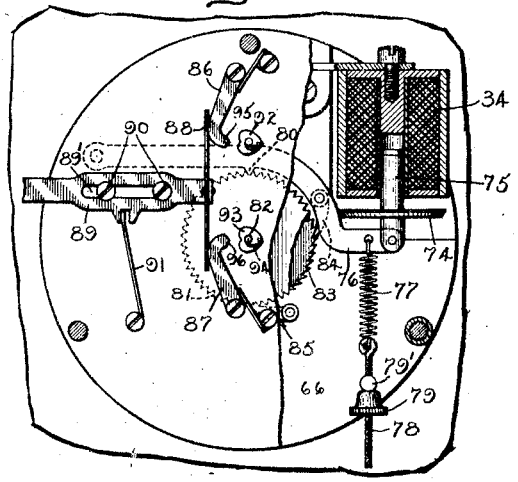
Witnesses:
Inventor,
William H. Pratt,
By Albert H. Davis
Att'y.

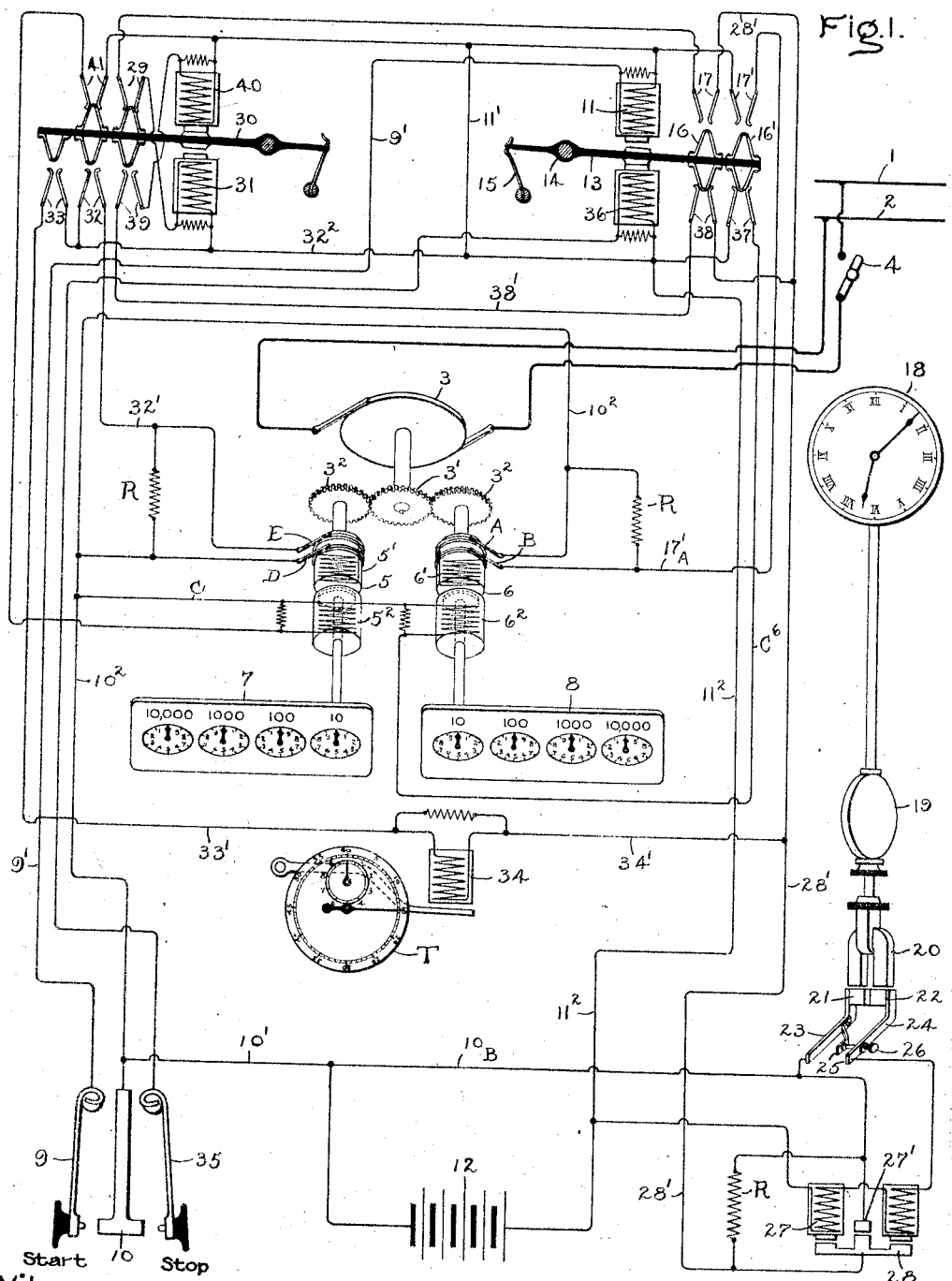

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

DEVICE FOR MEASURING TIME INTERVALS.

1,022,593.  Specification of Letters Patent.  Patented Apr. 9, 1912.

Application filed January 15, 1908. Serial No. 410,935.

*To all whom it may concern:*

Be it known that I, WILLIAM H. PRATT, a citizen of the United States, residing at Lynn, county of Essex, State of Massachusetts, have invented certain new and useful Improvements in Devices for Measuring Time Intervals, of which the following is a specification.

My invention relates to devices for measuring time-intervals, and has for an object the construction of an apparatus which will measure an interval of time with great precision.

Another object of my invention is the construction of an apparatus whereby an observer, who desires to know the exact time during which a phenomenon or group of phenomena which he is observing occurs, may start and stop a registering mechanism at the beginning and end of the period during which he desires to observe, and by comparing the record so obtained with a similar record automatically made by some time-measuring device, such as a clock for an exact, known period of time,—this record being made substantially simultaneously with the record made by the observer's action, thus determine the exact time during which his observation has been taken.

Another object of my invention is the construction of such an apparatus that it may be accurate, and reliable.

While my invention may be used in many ways, it is more especially applicable to that class of observations wherein it may be desired to know the exact time which it takes for a recurrent phenomenon, such, for example, as the rotation of a shaft or pointer, to take place.

My invention is an improvement over the various well known chronographic means for measuring intervals of time, since it dispenses with the necessity of measuring off records which are registered on paper or a similar material mounted on a drum and computing the length of the time interval, and gives readings directly upon a registering mechanism, from which the length of the interval can be quickly calculated. It thus furnishes a means which is much more rapid than a chronograph for measuring a time-interval.

For a better understanding of my invention, reference may be had to the accompanying drawings, in which—

Figure 1 is a diagrammatic view of my entire time-measuring device; Fig. 2 is an elevation, partly in section, showing certain details of construction of portions of my device; Fig. 3 is a sectional view on the line 3—3 of Fig. 2, partially broken away for a clearer understanding, of certain details of my invention; and Fig. 4 is a plan view of another portion of the apparatus which I employ.

Referring to Fig. 1, I have shown electric conductors 1—2, to which are connected by suitable connections an electric motor 3, which may be cut into and out of circuit by a switch 4. To one end of the motor shaft I have shown a gear-wheel $3'$, which is meshed with two gears $3^2$. These gears are attached by suitable shafting to magnetic clutches 5 and 6, which will be explained in detail more fully farther on in this specification, but which, in general, consist of a portion which rotates with the revolving gears $3^2$, a portion, which is stationary, and a portion which may be made to rotate. These clutches, when energized by the electric current, drive registering gear-trains 7 and 8, which may be of any well known construction, and whose object is to measure the number of rotations of the shafts to which the magnetic clutches are attached when these clutches are energized. I have shown a starting key 9, which may be pressed down by the observer, and which, when pressed down, makes contact with a contact member 10. As soon as contact is made electromagnet 11, which operates a magnetic switch, is energized by means of a battery 12; the circuit being closed through starting lever 9, conductor $9^1$, electromagnet 11, conductor $11^1$, conductor $11^2$, to battery 12, conductor $10^1$, and conducting member 10. As soon as magnet 11 is energized it pulls up the lever 13, which is pivoted in any suitable fashion to a fixed support by pivot 14, and is held in place by a retaining spring 15 in the well known fashion. When lever 13 is pulled up, or is in the reverse position to that shown in the figure, contact members 16 and $16^1$ make contact with clips 17 and 17¹. The contact made by contact member 16¹ and clips 17¹ energizes members C¹ of magnetic clutch 6, and thus causes dial-train 8 to be set in motion. The circuit being made by closing clips 17¹ is conductor 10¹, conductor 10², brush A, brush B, conductor 17¹, clips 17¹, conductor 11¹, conductor 11², and battery 12ᴬ. Brushes A B make contact with the revolving portion of the magnetic clutch 6 through suitable slip-rings whose construction is described more in detail with reference to Fig. 2. I have shown a clock 18, which has a pendulum 19, of any well known type, to the lower extremity of which is attached a permanent magnet 20. Suitably placed below the path of magnet 20, I have shown a contact device which consists of two armatures 21 and 22 attached to certain spring members 23—24, member 23 carrying a spring-contact 25, and member 24 carrying a contact-screw 26. Normally, the contact between members 25 and 26 is not made, but upon the passage of the pendulum bearing the permanent magnet over the armatures 21 and 22, these armatures are brought together by the mutual attraction of the armatures due to the flux induced in them by the magnet, and contact is made between the spring 25 and screw 26. I prefer to place the contact device so that it will be under the influence of the permanent magnet attached to the pendulum at the middle position of the swing of the pendulum, but it may be placed at any suitable portion of the pendulum's swing. While I have described a contact-making device of a certain character, I do not limit myself to this device, but may use any contact-making device of such a character that it can be operated at exact and known intervals of time. After registering-train 8 has been set in motion by the observer, the first swing of pendulum 19 will cause members 25 and 26 to make contact, and thus energize relay 27. When relay 27 is energized, armature 28 will be attracted toward it, and thus a conducting portion of it makes contact with a contact member 27¹, thereby energizing magnet 31; the circuit being made through conductor 28¹, clip 17, clip 29, magnet 31, conductor 32², conductor 11², battery 12, conductor 10ᴮ, contact member 27¹. When magnet 31 is energized, it will pull down lever 30, which is similar in construction to lever 13 previously described, except that it has three contact devices on its lower side, in place of the two which are on lever 13. Upon a change in position of lever 30 from that shown in the figure, clips 32 are connected together, whereby rotating member 5¹ of clutch 5 is energized, and registering train 7 is set in motion, the circuit being made through clip 32, conductor 32¹, brush E, brush D, conductor 10², conductor 10¹, battery 12, conductor 11² and conductor 32². Simultaneously, with the energizing of clutch member 5¹, lever 30, through closing clips 33, makes a circuit whereby magnet 34 of a time-counting device T, which will be described more in detail later, is energized periodically by the passage of magnet 20 over armatures 21 and 22 and the action of relay 27; the circuit being member 28, conductor 28¹, conductor 34¹, magnet 34, conductor 33¹, clips 33, conductor 32², conductor 11², battery 12, conductor 10ᴮ, contact member 27¹. The two registering trains 7 and 8 are now being revolved by motor 3, and so continue until the observer has finished his observation, and wishes to find the exact time which has elapsed since he started his observation. In order to do this he presses the stopping key 35 against contact member 10. This causes magnet 36, which is directly opposed in its operation to magnet 11, to be energized, and to pull lever 13 into the position shown in the figure; thus breaking contact between clips 17 and 17¹, and making contact between clips 37 and 38, through contact members similar to members 16 and 16¹. When clips 17¹ are open-circuited, rotating magnet 6¹ of clutch 6 is deënergized, and at the same time stationary magnet 6² is energized when circuit is made through clips 37, and thus in a manner to be described later, registering train 8 is instantly brought to rest, as magnet 6² acts as a brake. The circuit made in this case is clips 37, conductor C⁶, magnet 6², conductor C, conductor 10², conductor 10¹, battery 12, conductor 11². As soon after key 35 is brought into contact with contact member 10, as magnet 20 passes over armatures 21 and 22, and contact between members 25 and 26 is made, magnet 40 is energized, thus pulling lever 30 into the position shown in the figure; circuit being made through clips 38, conductor 28¹, member 28, member 27¹, conductor 10ᴮ, battery 12, conductor 11², conductor 11¹, magnet 40, clips 39 and conductor 38¹. When lever 30 has been pulled up in the position shown in the figure and made contact between clips 29 and 41, rotating member 5¹ of clutch 5 is deënergized, and stationary member 5² is energized, thus acting as a brake, and stopping registering train 7, instantaneously, as will be explained later in this specification. Registering train 8 has thus registered the number of revolutions occurring between the interval of pressing the starting key 9 and the stopping key 35,— that is to say, during the time of the observation and registering train 7 has thus registered the number of revolutions which have taken place during an integral number of time units, or, an exact number of seconds, if the pendulum 19 is a seconds pendulum. The exact time then of the observation will be the ratio between the readings of the registering train 8 and registering train 7 multiplied by the number of seconds during which registering train 7 has been in operation; this number being counted on the time-counting mechanism T, which will be described later. This ratio will be correct in case gear-wheels $3^2$ have both the same number of teeth. In case, however, for any desired reason, one gear-wheel is made with a different number of teeth than another, and thus will make a different number of rotations from the other, a suitable correction must be made. It will be obvious that while I have shown an electric motor geared to two driving shafts, any motor and any method of driving the two shafts may be employed. I have shown resistances R in shunt with the various magnets to prevent sparking.

Referring now to Fig. 2, which shows in detail the construction of the magnetic clutches, I have shown two supporting plates 42 and 43, which are connected and held apart by posts 44—45. Between these plates are magnetic clutches 5 and 6, clutch 5 being shown in section, both clutches being of a similar construction. 46 is a rotatable shaft connected to gear-wheel $3^2$, so that it will be turned by the action of motor 3. Supported upon this shaft is an electromagnet 47, which is immovably connected to the shaft by a set-screw 48. Mounted upon magnet 47, and suitably insulated in any well known fashion, are collector-rings 49, which make contact with suitable brushes, one of which, B, I have shown on clutch 6. These collector-rings are connected to the terminals of magnet 47 in the well known fashion. An adjustable friction-cap 50 is shown surrounding the end of magnet 47, and retained in position by means of locknut 51. Coöperating with rotatable magnet 47, I have shown the stationary magnet 52, which is held rigidly to plate 42 by means of clamp 53, screws 54 and shoulder 55. An adjustable friction-cap 56, with its lock-nut 57, both similar to the cap and nut for magnet 47, are provided for this magnet also. Drilled in the magnet 52 is a hole 58, which is adapted to receive shaft 59, which is supported by the portion 60 of magnet 52 and plate 61 of registering dial 7. On one extremity of shaft 59 is a disk of magnetic material 62 faced on both sides with some non-magnetic material 63, such as leather. At the opposite extremity of shaft 59 is mounted a driving-pinion 64, which meshes with gear 65 of the registering train 7 in the well known fashion. This pinion 64 is made with teeth of suitable width of face, so that shaft 59 may be moved longitudinally a suitable distance, without getting the teeth of pinion 64 and gear-wheel 65 out of mesh. The operation of this clutch is as follows: Shaft 46 is rotated through gear $3^2$ by the motor. Normally magnet 47 is not energized, and thus there is no tendency for the gear-train to be set in motion; and if desired, magnet 52 may be energized so as to absolutely prevent any such motion. After the observer has pressed the starting key, and thus caused the circuit of magnet 47 to be made, as previously described, by the clock pendulum, and magnetically operated switch 30, circuit of magnet 52 is opened and magnet 47 is energized, disk 62 is then pulled toward revolving magnet 47, and through magnetic force, made to revolve with shaft 46. This causes the registering train to be set in motion in the previously described fashion. When the observer desires to stop the movement of the registering train, so as to obtain the time of his observation, in the manner previously described, rotating magnet 47 is deënergized, and stationary magnet 52 is energized. This causes disk 62 to be attracted in a reverse direction from that previously described, and thus by magnetic force to be held in a fixed position against friction-cap 56. This causes the registering train to be stopped at once, as disk 62 acts as a magnetic brake, and hence the exact number of revolutions of shaft 46 will be registered. It will be understood that magnetic clutch 6 is similar in its action and construction to clutch 5, although the operation of making and breaking its various circuits, as previously described, is slightly dissimilar to that used in connection with clutch 5. It will also be understood that, while I have described a certain form of clutch, I do not limit myself to this particular construction; but may employ any form of clutch which will give the results that I may obtain by the form of clutch described.

Mounted on plate 42, and below the magnetic clutches, I have shown the time-counting mechanism, which is in its essential features a clock-work mechanism actuated by the action of pendulum 19, and registering every time the magnet 20 passes over a contact-making device, as previously described. I have shown this counting device as consisting of two dials which are constructed in the well known fashion, the larger dial registering sixty passages of the magnet 20,—or in other words, sixty seconds, and the smaller dial geared to it, and registering minutes in the well known fashion. It is obvious that any form of counting mechanism, which is desired, may be employed for this purpose. Referring to Fig. 2, which shows the elevation of the counting mechanism, I have shown plates 66—67 and dial 68 connected by posts 69 and 70, and secured to plate 42 by means of brackets 71 and 72. Referring now to Fig. 3, I have shown magnet 34 attached to post 70, post 70 being shown in Fig. 2. In conjunction with magnet 34 I have shown an armature 74, integral with which is a member 75, to which is pivoted the bent lever 76. The opposite extremity of lever 76 is secured by a pivot to plate 66. Lever 76 is held in a downward position by means of the spring 77, which is attached to rod 78 and by means of the adjusting nut 79, held against a post 79¹ in the well known fashion. On the lower edge of lever 76 is a V-shaped projection 80, which coöperates with the star-wheel 81, that is mounted on shaft 82. Mounted on shaft 82 is also a ratchet-wheel 83, with which ratchet 84 on lever 76 coöperates. There is also a spring-pressed pawl 85 mounted on plate 66, which coöperates with ratchet-wheel 83, and prevents any backward movement of this ratchet-wheel when ratchet 84 is disengaged from said wheel. The operation of this time-counting device is as follows: As previously described, magnet 34 is intermittently energized by the movement of the clock pendulum. Armature 74 is then lifted, and with it lever 76 and ratchet 84 are raised. Ratchet 84 then drops into mesh with the tooth behind that with which it was previously engaged, and upon a deënergization of magnet 34 the lower end of lever 76 is pulled down by the action of spring 77, and thus the ratchet-wheel is caused to rotate approximately the space of one tooth. In order to insure a uniform travel of one tooth, the V-shaped projection 80 on lever 76 is employed, as this will cause the ratchet-wheel and the shaft to revolve a space of one tooth exactly, since in its downward position it meshes with the star-wheel, and thus causes a uniform rotation of this wheel, and hence the measuring pointer. Pawl 85 prevents any backward movement of the wheel. In order to provide for a resetting of the pointers, and also of the pointers on registering trains 7 and 8, a resetting device is provided, as follows, the device not being shown for trains 7 and 8. As shown in Fig. 3, spring-pressed pawls 86 and 87 are in their normal position against the vertical spring 88. Member 88 is rigidly secured to the resetting lever 89, which has formed in it guide 89¹ operating in conjunction with supporting and guiding screws 90. Lever 89 is held in its outward position by means of spring 91. Mounted upon the pointer shafts are heart-shaped cams 92 and 93, which are flexibly connected to the shafts by means of springs 94. In order to operate this device, lever 89 is pressed, which causes members 95 and 96 of pawls 86 and 87, respectively, to engage against the cams 92 and 93, and thus causes them to rotate and return the indicating hands to their starting position. The unit pointer, which, in this case, is a second-recorder, has a starting position of one second, or beat, behind the zero position marked on the dial. This is in order to take care of the fractional beat of the pendulum, which occurs upon starting; for, after the operator has pressed the starting key, the pendulum must pass once over the contact device influenced by magnet 20, in order to start the registering train, which is actuated by the pendulum movement. This will cause the second pointer to assume a zero position, and upon the next movement of the pendulum over its middle position, which will occur with the present device after the lapse of one second, the pendulum will register one second.

Referring to Fig. 4, in Fig. 4 I have shown the contact devices operated by the clock. Mounted upon the floor of the clock 97 is a contact supporting member 98, which is held in position by brackets 99 and screws 100, and carries an insulating member 108. Mounted upon this member are the spring members 23 and 24, to which are secured magnetic members 21 and 22, and also contact spring 25 and adjustable contact screw 26. Spring members 23 and 24 are secured to member 108 by means of binding-posts 101 and 102, which serve as terminals for connecting the necessary conductors to the contact members 25 and 26. Suitable adjusting screws 103 and 104, and stops 105 and 106, which may be adjusted, are provided, as well as longitudinal adjusting screw 107, and vertical adjusting screw 109.

The operation of my device is as follows: When an observer desires to measure the exact time which elapses during his observation of any phenomenon, or group of phenomena, he presses the starting key of the mechanism, which, as previously described, causes a registering train to be set in motion by an electric motor. Directly after this a clock-work mechanism causes a second registering train to be set in motion by the same electric motor. The observer then, upon the conclusion of his observation, presses the stopping key, which immediately stops the registering train, which he has himself set in motion by the starting key, and upon the next passage of the pendulum over a predetermined point, the registering train, set in motion by the pendulum, is stopped also. The registering train set in motion by the clock-work mechanism will then register a certain number of revolutions for an integral number of exact time units or in this case an exact number of seconds: the number being read off from the time recording device. The registering train set in motion and stopped by the observer will register the number of revolutions which have occurred during the time of the observer's observation. By taking the ratio of these and comparing them with the exact number of time units recorded by the time-recorder, the exact length of time taken for the observation will be found with an accuracy which is very great.

I do not desire to limit myself to the particular construction and arrangement of parts here shown, since changes, which do not depart from the spirit of my invention, and which are within the scope of the present claims, will be obvious to those skilled in the art.

What I claim as new and desire to secure by Letters Patent of the United States, is:

1. The method of measuring an interval of time consisting in comparing the registration of a device registering during that interval of time with the registration of a substantially similar device registering an exact interval of time of substantially the same length as the interval whose length is to be measured, and by comparison of the two registrations determining the length of the interval to be measured.

2. The method of measuring an interval of time consisting in comparing the registration of a device registering during that interval of time with the registration of a substantially similar device registering an interval of time of substantially the same length as the interval to be measured, registering during substantially the same period, and registering only for an integral number of time-units, and by comparison of the two registrations determining the length of the interval to be measured.

3. The method of measuring an interval of time consisting in employing a device registering for an interval of time whose length it is desired to measure, a second substantially similar device registering an interval of time of substantially the same length, and only registering for an integral number of time-units, and by comparison of the registration of the two devices computing the exact length of the time-interval to be measured.

4. The method of measuring an interval of time consisting in employing a device which can be made to register during said interval, a second substantially similar device automatically registering a time-interval, of an integral number of time-units, of substantially the same length as the interval to be measured and occurring during substantially the same period, and by comparison and computation determining the exact length of the time-interval to be measured.

5. The method of measuring an interval of time consisting in employing a registering device which can be started and stopped at the beginning and end of said interval respectively, a second and substantially similar registering device automatically started and stopped at a time-point nearest to and next succeeding that at which the first device is started and stopped, and by comparison of the registration of the two devices and computation with the number of time-units during which the second device registers determining the length of the interval of time to be measured.

6. The method of measuring an interval of time consisting in employing a registering device which can be manually started and stopped at the beginning and end of said interval respectively, a second and substantially similar registering device automatically started and stopped by a clock-work mechanism at a point predetermined by the mechanism nearest to and next succeeding that at which the first device is started and stopped, and by comparison of the registration of the two devices and computation with the number of time-units during which the second device registers determining the length of the interval of time to be measured.

7. The method of measuring an interval of time consisting in employing a registering device which can be manually started and stopped at the beginning and end of said interval respectively, a second and substantially similar registering device automatically started and stopped so that it will register during an integral number of time-units and by comparison of the registration of the two devices and computation with the number of time-units during which the second device registers determining the length of the interval of time to be measured.

8. The method of measuring an interval of time consisting in employing a registering device which can be started and stopped at the beginning and end of said interval respectively, a second and substantially similar registering device automatically started and stopped by a time-pendulum operating means and by comparison of the registration of the two devices and computation with the number of time units during which the second device registers determining the length of the interval of time to be measured.

9. The method of measuring an interval of time consisting in employing a registering device which can be started and stopped at the beginning and end of said interval respectively, a second and substantially similar registering device automatically started and stopped by a time-pendulum operating means at a predetermined point in the swing of the pendulum immediately succeeding starting of the first device and stopped by the pendulum's operating means at the same point of its swing immediately succeeding the stopping of the first device, a time-counting device actuated by the time-pendulum operating means counting the time of registration of the second registering device and by comparison of the registration of the two devices and computation with the number of time-units counted by the time-counting device determining the length of the interval of time to be measured.

10. The method of measuring time-intervals consisting in employing a device registering the interval of time to be measured, a second and substantially similar device automatically registering for the integral number of time-units nearest to that of the time-interval to be measured and by comparison of the two registrations and computation with the number of time-units through which the second device registers determining the length of the interval of time to be measured.

11. An apparatus for the measurement of time-intervals comprising a registering device and means for causing the same to register during the interval of time to be measured in combination with a second registering device for comparing the registration of said first mentioned device, and means for causing said second registering device to register for an integral number of time-units.

12. An apparatus for the measurement of time-intervals comprising a registering device and means for causing the same to register during the interval of time to be measured in combination with a second registering device and means for causing the same to register for an integral number of time-units nearest to the length of the time-interval whose length is to be measured.

13. An apparatus for the measurement of time-intervals comprising a registering device, means for causing the same to register during the interval of time to be measured, a second registering device whose rate of registration bears a constant and known relation to the rate of registration of the first mentioned device, means for causing the second mentioned device to register for an integral number of time-units, and a device for counting the number of time-units during which said second registering device registers.

14. An apparatus for the measurement of time-intervals comprising a registering device, means for causing the same to register during the interval of time to be measured, a second and substantially similar device, a time-marking means, and means in operative relation therewith for causing the second device to register for an integral number of time-units.

15. An apparatus for the measurement of time intervals comprising a registering device, means for causing the same to register during the interval of time to be measured, a second and substantially similar device, a clockwork means, and means in operative relation therewith for causing said second device to start and stop registering for an integral number of time-units.

16. An apparatus for the measurement of time-intervals comprising a registering device, means for causing the same to register during the interval of time to be measured, a second and substantially similar device, a time-pendulum, means in operative relation therewith for causing the second device to automatically register for an integral number of time units, and a device for counting the number of time-units during which the second registering device registers.

17. An apparatus for the measurement of time-intervals comprising a registering device, means for causing the same to register during the interval of time to be measured, a second and substantially similar device, a seconds pendulum, and means in operative relation therewith for causing the second device to automatically register for an exact number of seconds.

18. An apparatus for the measurement of time-intervals comprising a registering device, means for causing the same to register the interval of time to be measured, a second and substantially similar device, a seconds pendulum, a means in operative relation therewith for causing the second device to automatically register for an exact number of seconds, and a device for counting the number of seconds during which the second registering device registers.

19. An apparatus for the measurement of time-intervals comprising a registering device, means for causing the same to register during the interval of time to be measured, a second and substantially similar device, a time-pendulum, and means in operative relation therewith for causing said second device to start and stop registering at a fixed point of the pendulum's swing.

20. An apparatus for the measurement of time intervals comprising a registering device, means for causing the same to register during the interval of time to be measured, a second and substantially similar device, a time-pendulum, means in operative relation therewith for causing said second device to start and stop registering at a fixed point of the pendulum's swing, and a time-counting means counting the number of pendulum swings.

21. An apparatus for the measurement of time-intervals comprising a registering device, means for causing the same to start and stop registering at the beginning and end of said interval respectively, a second device substantially similar to the first device, a clockwork means, and means in operative relation therewith for causing the second device to start and stop registering.

22. An apparatus for the measurement of time-intervals comprising a registering device, means for causing the same to start and stop registering at the beginning and end of said interval respectively, a second device substantially similar to the first device, a time-pendulum, means in operative relation therewith for causing the second device to start and stop registering, and a time-counting means counting the time during which the second registering device registers.

23. An apparatus for the measurement of intervals comprising a registering device, means manually operative for causing the same to start and stop registering at the beginning and end of said interval respectively, a second and substantially similar device, means for causing the same to automatically register during an integral number of exact time-units, starting and stopping it at the exact time-point immediately succeeding the time at which the first device is started and stopped, respectively.

24. An apparatus for the measurement of time-intervals comprising a registering device, means manually operative for causing the same to start and stop registering at the beginning and end of said interval respectively, and a second and substantially similar device automatically made to register during the integral number of exact time-units nearest the length of the time-interval whose length is to be measured.

25. A device for measuring time-intervals comprising means for causing a registering device to register, and a second means causing a second and substantially similar device to register for an integral number of exact time-units, the second means being so interconnected with the first as to cause the second device to start and stop registering at predetermined time-points immediately succeeding the starting and stopping points, respectively, of the first device.

26. In combination, two substantially similar registering devices, means for driving these devices, means for starting and stopping one device, and means interconnected with the second means for starting and stopping the second device.

27. In combination, two substantially similar registering devices, a registering source, means for connecting each device to the registering source, manually actuated means for actuating one connecting means, a clockwork mechanism and means operated by the clockwork mechanism for actuating the other connecting means.

28. In combination, two substantially similar registering devices, a registering source, means for connecting each device to the registering source, manually-actuated means for actuating one connecting means, a clockwork mechanism and means operated by the clockwork mechanism and interconnected with the first means for actuating the other connecting means, and a device for counting the time during which one of the registering devices registers.

29. In combination, two substantially similar registering devices, a registering source, means for connecting each device to the registering source, manually-actuated means for actuating one connecting means, a clockwork mechanism and means operated by the clockwork mechanism for actuating the other connecting means for an integral number of exact time-units.

30. In combination, two substantially similar registering devices, a registering source, means for connecting each device to the registering source, manually-actuated means for actuating one connecting means, a clockwork mechanism, means operated by the clockwork mechanism for actuating the other connecting means for an integral number of exact time-units, and a device for counting the number of time-units during which the clockwork mechanism actuated registering device registers.

31. In combination, two substantially similar registering devices, a registering source, means for connecting each device to the registering source, manually-actuated means for actuating one connecting means, a clockwork mechanism, and means interconnected with the manually-operated means and actuated by the clockwork mechanism for actuating the other connecting means for the integral number of exact time-units nearest the number during which the first connecting means is actuated.

32. The combination, in an apparatus for measuring time intervals, of an operating source, two substantially similar registering devices which may be connected to the source, and means for connecting and disconnecting one of said devices with said source at the beginning and end of the interval to be measured, a clockwork mechanism, and means actuated by the clockwork mechanism for connecting and disconnecting the second registering device from the source at points predetermined by the clockwork mechanism.

33. The combination, in a device for measuring time-intervals, of an operating source, two substantially similar registering devices which may be independently connected to the source, means for connecting and disconnecting one of said devices with said source at the beginning and end of the interval to be measured, a clockwork mechanism, and means interconnected with the first means and actuated by the clockwork mechanism for connecting and disconnecting the second registering device from the source at points predetermined by the clockwork mechanism and immediately succeeding respectively the time at which the first registering device is connected and disconnected.

34. The combination, in a device for measuring time-intervals, of an operating source, two substantially similar registering devices which may be independently connected to the source, means for connecting and disconnecting one of said devices with said source at the beginning and end of the interval to be connected, a clockwork mechanism, means interconnected with the first means and actuated by the clockwork mechanism for connecting and disconnecting the second registering device from the source at points predetermined by the clockwork mechanism and immediately succeeding respectively the time at which the first registering device is connected and disconnected, and a time-counting device for counting the number of time-units during which the second registering device is caused to register.

35. The combination, in a device for measuring time-intervals, of an operating source, two substantially similar registering devices which may be independently connected to the source, means for connecting each of said devices to the operating source and for disconnecting the same so as to bring the moving parts of the registering devices instantly to rest, means for actuating one of said connecting and disconnecting means, a clockwork means for actuating the second of said connecting and disconnecting means, and so connected that it causes the second registering device to only register for an integral number of exact time-units.

36. The combination, in a device for measuring time-intervals, of an operating source, two substantially similar registering devices which may be independently connected to the source, means for connecting each of said devices to the operating source and for disconnecting the same so as to bring the moving parts of the registering devices instantly to rest, means for actuating one of said connecting and disconnecting means, a time-pendulum, means in operative relation to actuating means on the time-pendulum during a portion of the pendulum's swing for actuating the second of said connecting and disconnecting means and so connecting that it causes the second registering device to only register for an integral number of exact time-units, and a time-counting device for counting the number of time-units during which the second registering device registers.

37. The combination, in a device for registering time-intervals, of an operating source, two substantially similar registering devices which may be independently connected to the source, means for connecting each of said devices to the operating source and for disconnecting the same so as to bring the moving parts of the registering devices instantly to rest, means for actuating one of said connecting and disconnecting means, a time-pendulum, and means in operative relation to actuating means on the time-pendulum during a portion of the pendulum's swing so as to cause the second registering device to start registering when the pendulum first passes the operative portion of its swing after the first registering device has been started registering and to stop registering when the pendulum first passes over the operative portion of its swing after the second device has been stopped registering.

38. The combination, in a device for registering time-intervals, of an operating source, two substantially similar registering devices which may be independently connected to the source, means for connecting each of said devices to the operating source and for disconnecting the same so as to bring the moving parts of the registering devices instantly to rest, means for actuating one of said connecting and disconnecting means, a time-pendulum, means in operative relation to actuating means on the time-pendulum during a portion of the pendulum's swing so as to cause the second registering device to start registering when the pendulum first passes the operative position of its swing after the first registering device has been started registering and to stop registering when the pendulum first passes over the operative position of its swing after the second device has been stopped registering, and a time-counting device for counting the number of time-units during which the second registering device registers.

39. The combination, in a device for measuring time-intervals, of a motor driving two shafts, two substantially similar revolution counting devices for counting the number of revolutions of each shaft, means for connecting and disconnecting each device to a shaft, means for actuating one of said connecting and disconnecting means, a clockwork mechanism, and means actuated by the clockwork mechanism for actuating the other connecting and disconnecting means.

40. The combination, in a device for measuring time-intervals, of a motor driving two shafts, two substantially similar revolution counting devices for counting the number of revolutions of each shaft, a clutch mechanism for connecting each device to a shaft, means for actuating one of said clutches, a clockwork mechanism, and means in operative relation therewith for actuating the second clutch.

41. The combination, in a device for measuring time-intervals, of a motor driving two shafts, two substantially similar revolution counting devices for counting the number of revolutions of each shaft, clutch mechanisms for connecting each device to a shaft, means for actuating one of said clutches, a clockwork mechanism, and means in operative relation therewith for operating the second clutch and so interconnected with the first clutch-actuating means that it will only actuate its clutch after the first clutch has been actuated.

42. The combination, in a device for measuring time-intervals, of a motor driving two shafts, two substantially similar revolution counting devices for counting the number of revolutions of each shaft, clutch mechanism for connecting each device to a shaft, means for actuating one of said clutches, a clockwork mechanism, and means in operative relation therewith for causing the second clutch to operate for an integral number of exact time-units.

43. The combination, in a device for measuring time-intervals, of a motor driving two shafts, two substantially similar revolution counting devices for counting the number of revolutions of each shaft, clutch mechanism for connecting each device to a shaft, means for actuating one of said clutches, a clockwork mechanism, and means in operative relation therewith for operating the second clutch and so interconnected with the first clutch-actuating means that it will cause the second clutch to be actuated for the integral number of exact time-units nearest the number for which the first clutch is actuated, and a time-counting mechanism for counting the number of time-units during which the second clutch is actuated.

44. The combination, in a device for measuring time-intervals, of a motor driving two shafts, two substantially similar revolution counting devices, electromagnetic means for independently connecting the revolution counting devices respectively to the shaft, means for operating one of the electromagnetic means, a clockwork mechanism, and a second means operated by the clockwork mechanism for operating the second of said electromagnetic means.

45. The combination, in a device for measuring time-intervals, of a motor driving two shafts, two substantially similar revolution counting devices, electromagnetic means for independently connecting the revolution counting devices respectively to the shafts, means for operating one of the electromagnetic means, a time pendulum means in operative relation therewith, and a means in operative relation with said means for performing the same operations on the second electromagnetic means as have been performed upon the first electromagnetic means at points predetermined by the pendulum-actuating means and immediately after they have been performed upon the first electromagnetic means.

46. The combination, in a time-interval measuring apparatus, of an electric motor driving two shafts, two substantially similar registering devices for registering the number of revolutions of the shafts, electrically-operated clutches for connecting the registering devices to the shafts and disconnecting the same from the shafts, electrically-operated relays operating said clutches, means for operating one of said relays, a clockwork mechanism, and means operated by the clockwork mechanism for operating the other relay.

47. The combination, in a time-interval measuring apparatus, of an electric motor driving two shafts, two substantially similar registering devices for registering the number of revolutions of the shafts, electrically-operated clutches for connecting the registering devices to the shafts and disconnecting the same from the shafts, electrically-operated relays operating said clutches, means for operating one of said relays, a time-pendulum, and means in operative relation therewith for operating the second relay so that the registering device which it controls registers for an integral number of exact time-units.

48. The combination, in a time-interval measuring apparatus, of an electric motor driving two shafts, two substantially similar registering devices for registering the number of revolutions of the shafts, electrically-operated clutches for connecting the registering devices to the shafts, electrically-operated braking devices for causing the registering devices to stop instantaneously when they are disconnected from the revolving shafts, and electrically-operated relays for operating the clutches or braking devices alternately, means for controlling one of said relays, a time-pendulum, and means in operative relation therewith for controlling the other of said relays in operative relation to said means, the relay circuits being so interconnected that the pendulum-operated clutch and braking devices can only be operated after the other clutch and braking devices have been operated and the clutch is operated for a time-period covering an integral number of exact time-units.

49. The combination, in a time-interval measuring apparatus, of an electric motor driving two shafts, two substantially similar registering devices for registering the number of revolutions of the shafts, electrically-operated clutches for connecting the registering devices to the shafts, electrically-operating braking devices for causing the registering devices to stop instantaneously when they are disconnected from the revolving shafts, and electrically-operated relays for operating the clutches or braking devices alternately, means for controlling one of said relays, a time pendulum, and means in operative relation therewith for controlling the other of said relays, the relay circuits being so interconnected that the pendulum-operated clutch and braking devices can only be operated after the other clutch and braking devices have been operated and the clutch is operated for the time-period covering the integral number of exact time-units nearest that through which the first clutch operates, and a device for counting the time of operation of the main clutch-actuated by the time-pendulum actuating means.

In witness whereof, I have hereunto set my hand this thirteenth day of January, 1908.

WILLIAM H. PRATT.

Witnesses:
  JOHN A. McMANUS, Jr.,
  CHARLES A. BARNARD.